(12) United States Patent
Zeigler

(10) Patent No.: US 7,455,164 B2
(45) Date of Patent: Nov. 25, 2008

(54) EXPANDABLE AND COLLAPSIBLE STRUCTURE WITH ROLLERS

(75) Inventor: Theodore R. Zeigler, Alexandria, VA (US)

(73) Assignee: World Shelters, Inc., Alexandria, VA (US)

( * ) Notice: Subject to any disclaimer, the term of this patent is extended or adjusted under 35 U.S.C. 154(b) by 646 days.

(21) Appl. No.: 10/905,644

(22) Filed: Jan. 14, 2005

(65) Prior Publication Data

US 2006/0157100 A1 Jul. 20, 2006

(51) Int. Cl.
*B65G 13/00* (2006.01)
(52) U.S. Cl. ............................. 193/35 TE; 193/35 MD
(58) Field of Classification Search ............. 193/35 TE, 193/35 MD; 52/645, 646, 648.1
See application file for complete search history.

(56) References Cited

U.S. PATENT DOCUMENTS

| | | | |
|---|---|---|---|
| 3,190,405 A | 6/1965 | Squire | |
| 3,496,687 A | 2/1970 | Greenberg et al. | |
| 3,968,808 A | 7/1976 | Zeigler | |
| 4,026,313 A | 5/1977 | Zeigler | |
| 4,036,466 A | 7/1977 | Van Meter | |
| 4,276,726 A | 7/1981 | Derus | |
| 4,280,521 A | 7/1981 | Zeigler | |
| 4,290,244 A | 9/1981 | Zeigler | |
| 4,334,660 A | 6/1982 | Zeigler | |
| 4,359,305 A * | 11/1982 | Young et al. | 414/789.9 |
| 4,437,275 A | 3/1984 | Zeigler | |
| 4,473,986 A | 10/1984 | Zeigler | |
| 4,512,097 A | 4/1985 | Zeigler | |
| 4,518,061 A * | 5/1985 | Wehmeyer et al. | 187/269 |
| 4,522,008 A | 6/1985 | Zeigler | |
| 4,561,618 A | 12/1985 | Zeigler | |
| 4,579,066 A | 4/1986 | Zeigler | |
| 4,625,830 A * | 12/1986 | Wehmeyer et al. | 182/19 |
| 4,637,180 A | 1/1987 | Zeigler | |
| 4,658,560 A | 4/1987 | Beaulieu | |
| 4,689,932 A | 9/1987 | Zeigler | |
| 4,747,239 A | 5/1988 | Zeigler | |
| 4,761,929 A | 8/1988 | Zeigler | |
| 4,800,663 A | 1/1989 | Zeigler | |
| 4,838,003 A | 6/1989 | Zeigler | |
| 4,970,841 A | 11/1990 | Zeigler | |
| RE33,710 E | 10/1991 | Zeigler | |
| 5,230,196 A | 7/1993 | Zeigler | |
| 5,274,980 A | 1/1994 | Zeigler | |
| 5,327,700 A | 7/1994 | Sorenson et al. | |
| 5,367,852 A | 11/1994 | Masuda et al. | |
| 5,444,946 A | 8/1995 | Zeigler | |
| 5,456,347 A * | 10/1995 | Best et al. | 198/781.06 |
| 5,456,348 A * | 10/1995 | Whetsel et al. | 198/812 |
| 5,632,371 A * | 5/1997 | Best et al. | 198/781.1 |
| 5,651,228 A | 7/1997 | Zeigler | |
| 5,701,713 A | 12/1997 | Silver | |
| 6,141,934 A | 11/2000 | Zeigler | |
| 6,550,491 B1 | 4/2003 | Bixler et al. | |
| 6,585,083 B2 | 7/2003 | Santarlasci | |

(Continued)

*Primary Examiner*—Douglas A Hess
(74) *Attorney, Agent, or Firm*—WRB-IP LLP

(57) ABSTRACT

An expandable and collapsible structure includes a plurality of roller supports, each roller support including at least two ends separated by a non-zero distance and at least one roller disposed at one of the at least two ends of the roller support, and at least one folding assembly disposed between two of the plurality of roller supports.

15 Claims, 7 Drawing Sheets

U.S. PATENT DOCUMENTS

| | | | |
|---|---|---|---|
| 6,588,568 B1 * | 7/2003 | Flippo | 193/35 TE |
| 6,598,614 B2 | 7/2003 | Liu | |
| 6,729,460 B2 | 5/2004 | Esser et al. | |
| 6,799,594 B2 | 10/2004 | Kuo | |
| 7,188,842 B2 * | 3/2007 | Thorpe | 280/6.153 |
| 7,296,699 B2 * | 11/2007 | Hung et al. | 211/189 |

* cited by examiner

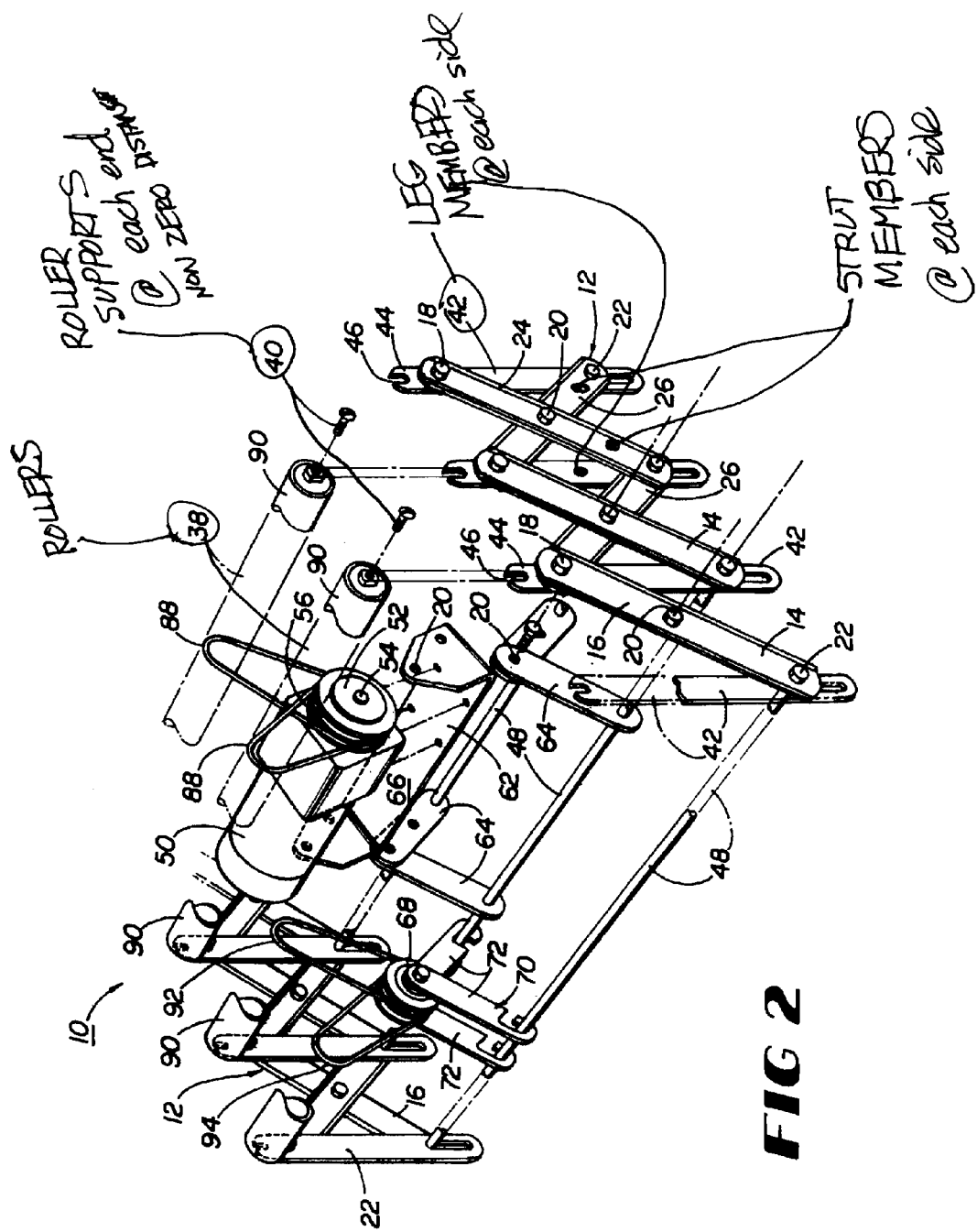

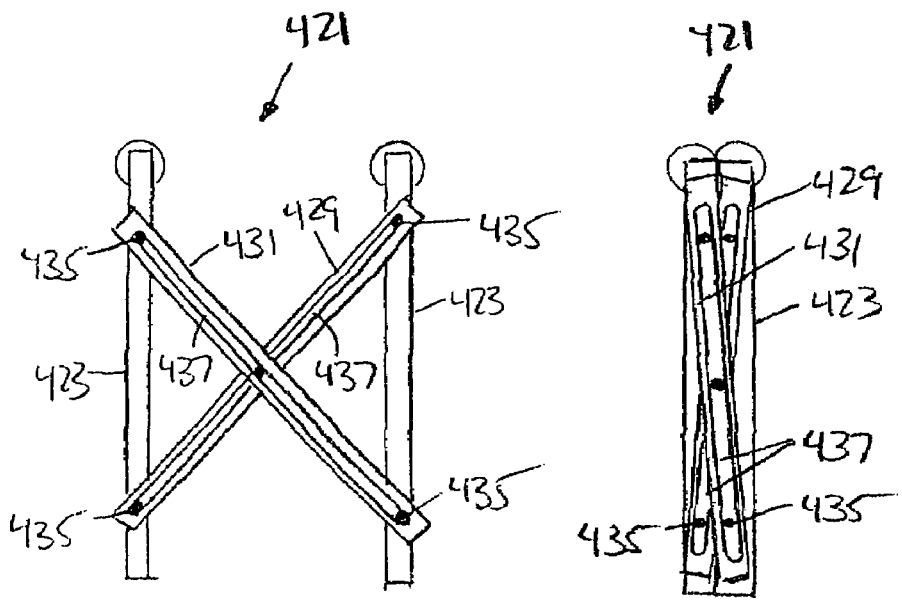
FIG. 6A  FIG. 6B
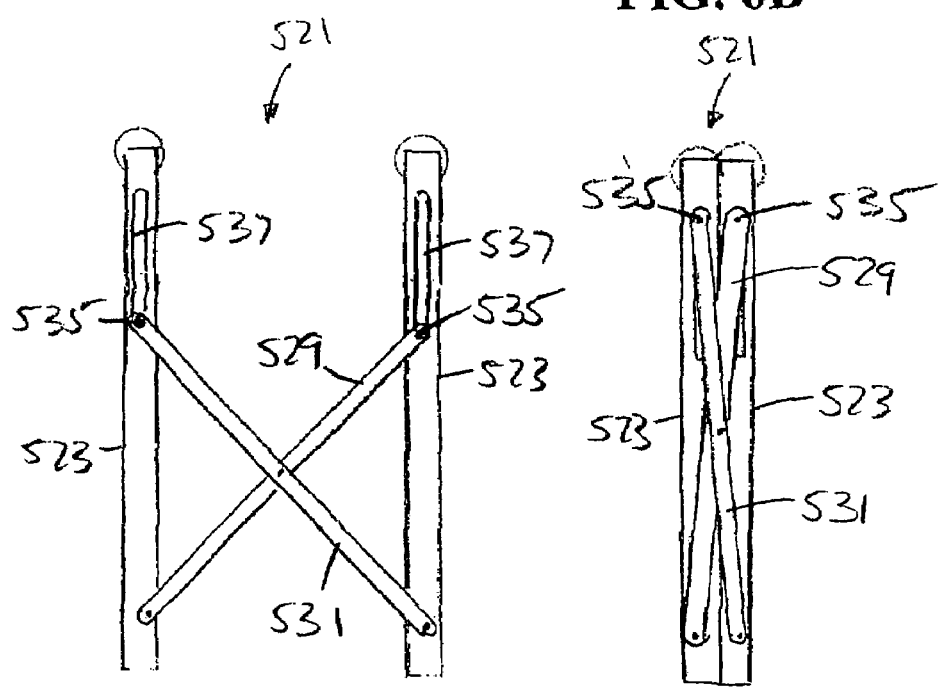
FIG. 7A  FIG. 7B

EXPANDABLE AND COLLAPSIBLE STRUCTURE WITH ROLLERS

BACKGROUND AND SUMMARY

The present invention relates to expandable and collapsible structures and, more particularly, to expandable and collapsible structures including rollers.

My prior U.S. Pat. Nos. 6,141,934, 5,651,228, 5,444,946, 5,274,980, 5,230,196, RE33,710, 4,970,841, 4,838,003, 4,800,663, 4,761,929, 4,747,239, 4,689,932, 4,666,102, 4,637,180, 4,579,066, 4,561,618, 4,522,008, 4,512,097, 4,473,986, 4,437,275, 4,334,660, 4,290,244, 4,280,521, 4,026,313, and 3,968,808 are incorporated by reference and show various collapsible structures and components therefor. These structures are generally intended for uses such as shelters and display and are typically designed to support loads comprising covers and other miscellaneous items, and are also typically designed for flexibility to accommodate outside forces such as wind.

It is desirable to provide expandable and collapsible structures that can support substantial loads while also remaining substantially rigid under a variety of conditions. Such structures can be particularly useful in supporting or conveying heavy loads, such as for purposes of conveying a human on a body board through a series of decontamination stations. My U.S. patent application Ser. No. 10/709,786, entitled EXPANDABLE AND COLLAPSIBLE MODULAR STRUCTURE, filed May 27, 2004, is incorporated by reference and discloses one such structure. U.S. Pat. No. 6,729,460 is incorporated by reference and discloses a rapid deploy roller transfer device that is rather complex in construction and may not be capable of supporting substantial loads. It is desirable to provide expandable and collapsible structures that can support substantial loads while also remaining substantially rigid under a variety of conditions and that are simple to construct and have relatively few components.

In accordance with one aspect of the present invention, an expandable and collapsible structure includes a plurality of roller supports, each roller support including at least two ends separated by a non-zero distance and at least one roller disposed at one of the at least two ends of the roller support, and at least one folding assembly disposed between two of the plurality of roller supports.

BRIEF DESCRIPTION OF THE DRAWINGS

The features and advantages of the present invention are well understood by reading the following detailed description in conjunction with the drawings in which like numerals indicate similar elements and in which:

FIG. 2 is a perspective view of an expandable and collapsible structure according to an embodiment of the present invention;

FIGS. 6A and 6B are side views of an expandable and collapsible structure according to an embodiment of the present invention in an expanded and a collapsed condition, respectively;

FIGS. 7A and 7B are side views of an expandable and collapsible structure according to an embodiment of the present invention in an expanded and a collapsed condition, respectively;

DETAILED DESCRIPTION

Figure 1A:
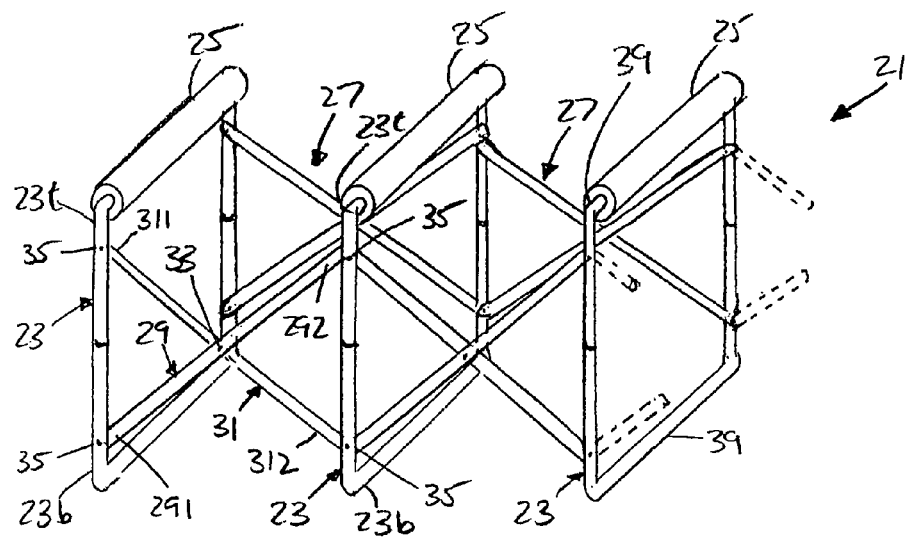
FIGS. 1A and 1B are perspective view of an expandable and collapsible structure according to an embodiment of the present invention in an expanded and a collapsed condition, respectively.
Figure 1B:
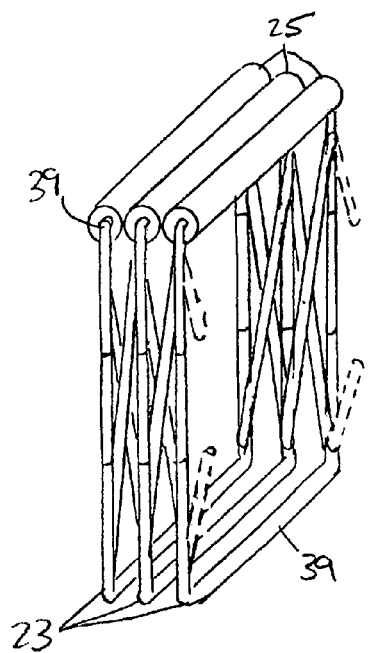
Figure 1C:
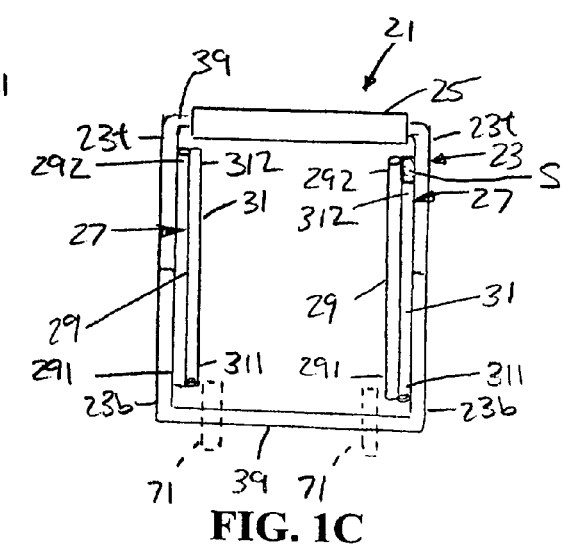
FIG. 1C is an end view of the structure of FIG. 1A.

An expandable and collapsible structure 21 according to an embodiment of the present invention is shown in FIGS. 1A-1C. The structure 21 includes a plurality of roller supports 23. Each roller support 23 includes at least two ends, such as a top and a bottom end, and at least one roller 25 disposed at at least one of the at least two ends, ordinarily at a top end of the roller support. The at least two ends are separated from one another by a non-zero distance when the device is in an expanded or a collapsed condition. At least one folding assembly 27 is disposed between two of the plurality of roller supports 23, and ordinarily at least one folding assembly is disposed between each adjacent pair of roller supports. Ordinarily, as seen in FIGS. 1A-1B, a plurality—ordinarily two—folding assemblies 27 are disposed between each adjacent pair of roller supports.

Figure 3:
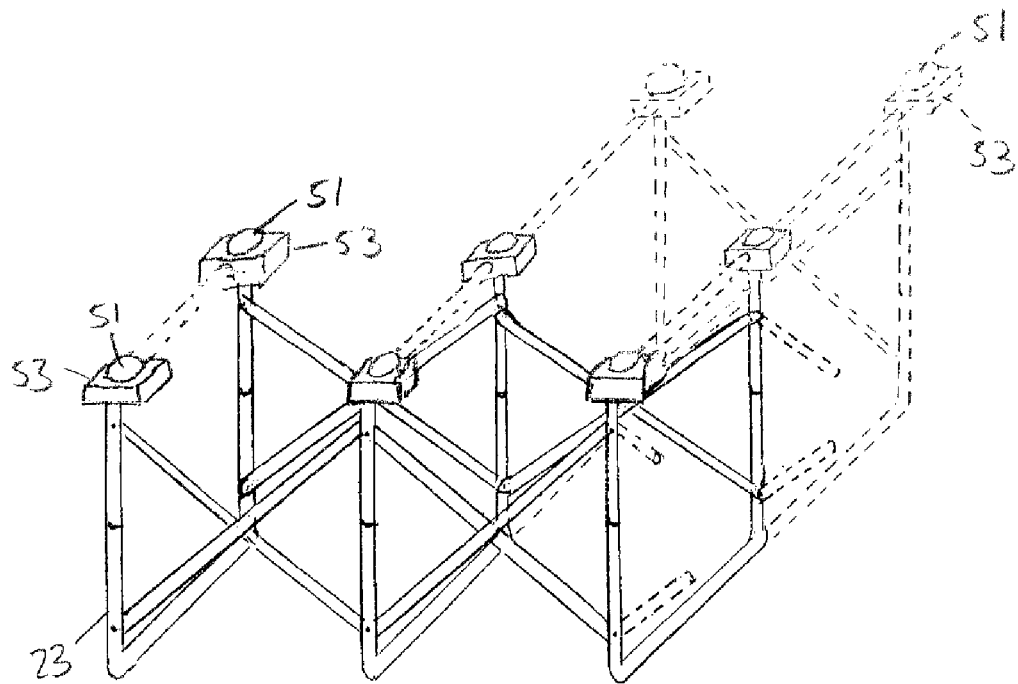
FIG. 3 is a perspective view of an expandable and collapsible structure according to an embodiment of the present invention.

FIGS. 1A and 1B show three roller supports 23 but indicate, in phantom lines, that the structure 21 can continue substantially infinitely in length. As seen in FIG. 2, the structure can also include a plurality of roller supports 23 arranged side-by-side and can be substantially infinite in width. FIGS. 1A and 1B show three roller supports with rollers 25 all arranged to turn around parallel axes, however, roller supports with rollers arranged to turn around different axes, such as balls 51 rotatably mounted in bearing assemblies 53, can be connected to one another, as seen in FIG. 3.

When in an expanded condition, appropriately configured embodiments of the structure 21 can be adapted for various uses, including use as a conveyor. Appropriately configured embodiments of the structure 21 can be collapsed to a size substantially smaller than the expanded size of the structure, which can facilitate transport of the structure. Such structures can be useful in, for example, emergency situations, such as when a conveyor is needed to convey body boards through decontamination stations.

In the embodiment of FIGS. 1A-1C, the at least one folding assembly 27 includes at least one scissor assembly. The at least one scissor assembly includes at least two strut members 29 and 31. Ordinarily, the at least two strut members will be pivotably connected to each other by a pin 33.

By providing strut members 29 and 31 of equal length and by providing the pin 33 at a mid-point along the length of each strut member, the ends of the strut members will lie along two substantially parallel lines as seen in FIGS. 1A and 1B. When the roller supports 23 are planar structures, planes defined by the roller supports 23 to which such struts are attached can be parallel.

Figure 4:
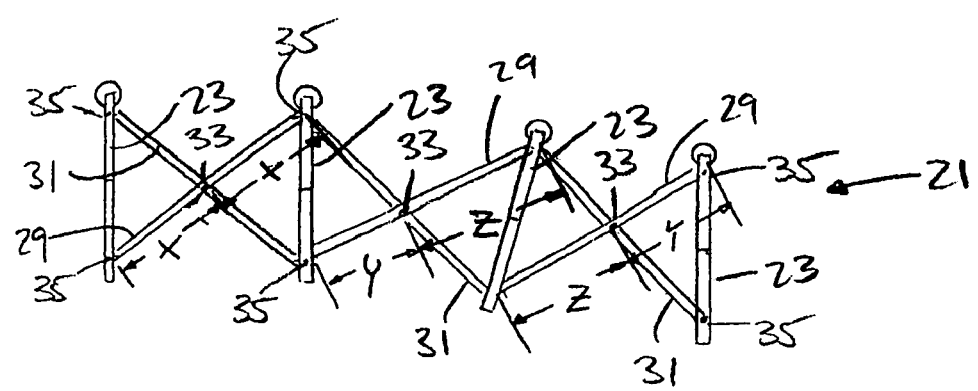
FIG. 4 is a side view of an expandable and collapsible structure according to an embodiment of the present invention.

By offsetting the location of the pin 33 from the midpoint of the struts 29 and 31, planes defined by the roller supports 23 can be non-parallel, which may be desirable when it is desired to form a structure that is curved, as seen in FIG. 4. As seen in FIG. 4, when the roller supports 23 are planar, and struts 29 and 31 are pivotably attached to the rollers supports 23, such as about pivot pins 35, at the same top and bottom points, when the struts are the same length, and are pinned at a midpoint between the ends of the struts, the distance from the pin 33 at the centerpoint to either end is equal, i.e., length X=length X. When the pin 33 is offset from the midpoints between the ends of the struts, such as at length Y<length Z, then the roller supports 23 will be non-parallel and the structure 21 will define an angle or curve along its length. There are, of course, other ways that the structure can be caused to turn or curve vertically and/or horizontally.

Figure 5A:
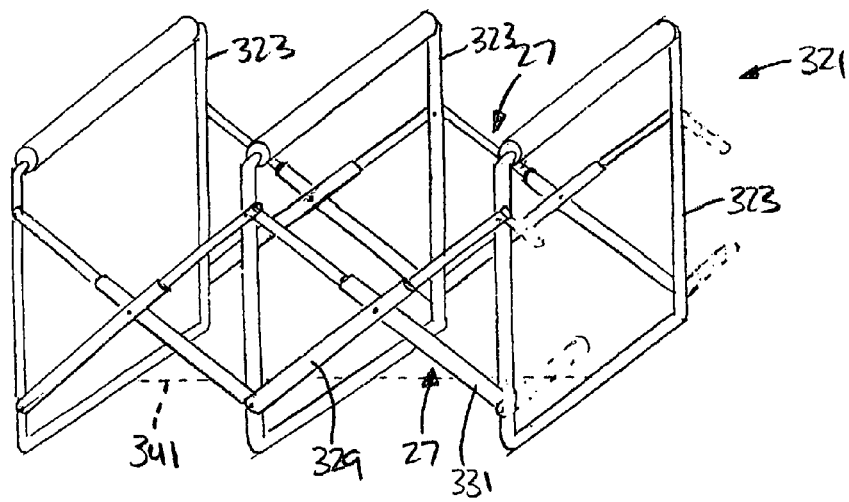
FIGS. 5A and 5B are perspective view of an expandable and collapsible structure according to an embodiment of the present invention in an expanded and a collapsed condition, respectively.
Figure 5B:
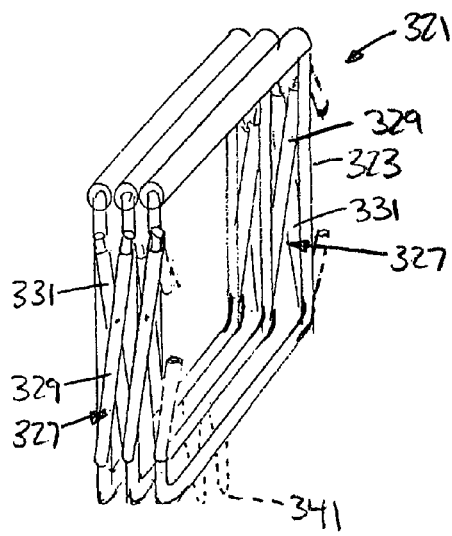
Figure 5C:
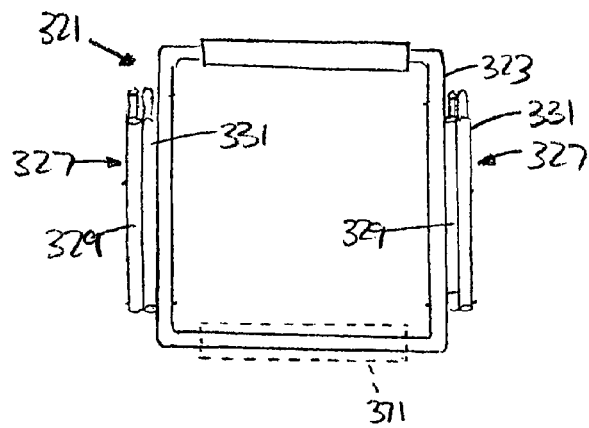
FIG. 5C is an end view of the structure of FIG. 5A.

In the embodiment seen in FIGS. 5A-5C, a structure 321 with a folding assembly 27 in the form of a scissor assembly with two strut members 329 and 331 is provided. Unlike in the embodiment shown in FIGS. 1A-1C wherein the roller support 23 is enlargeable, for example, by being telescopic, in the embodiment of FIGS. 5A-5C, the strut members 329 and 331 are enlargeable, for example by being telescopic, while the roller support 323 is of a fixed length. If desired, of course, other embodiments wherein both the roller supports and the folding assembly are enlargeable, such as by being telescopic, (not shown) can be provided. Also, instead of being pivotably pinned to the roller supports, structures 421 can be provided with strut members 429, 431 that can be slidably attached to the roller supports 423, such as by pins 435 extending from the roller supports through elongated slots 437 in the strut members as seen in FIGS. 6A-6B. Further, structures 521 can be provided with strut members 529, 531 that can be slidably attached to the roller supports 523, such as by pins 535 extending from the strut members 529, 531 through elongated slots 537 in the roller supports 523 as seen in FIGS. 7A-7B.

FIGS. 1A-1C show an embodiment of a structure 21 wherein the roller supports 23 include two vertical leg members 37. The vertical leg members 37 in the embodiment of FIGS. 1A-1C are telescopic. The strut members 29 and 31 are constant length members. When the structure is in an expanded condition, as seen in FIG. 1A, the leg members 37 are at a shortest length and, when the structure is in a collapsed condition, as seen in FIG. 1B, the leg members are telescoped to a longer length, with longitudinal axes of the leg members being substantially parallel to longitudinal axes of the strut members 29 and 31.

Figure 8:
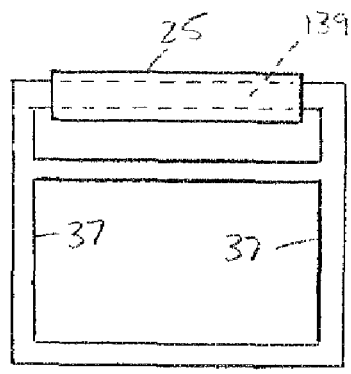
FIGS. 8-11 are end views of expandable and collapsible structures according to embodiments of the present invention.
Figure 10:
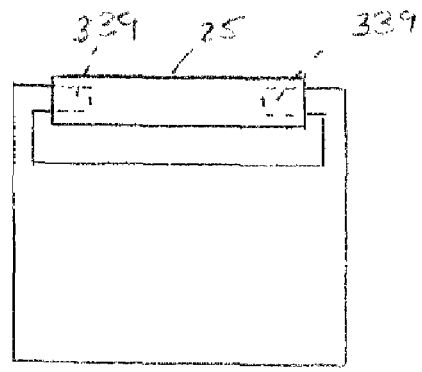
Figure 9:
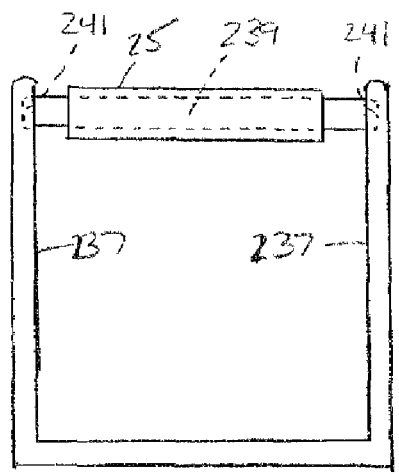
Figure 11:
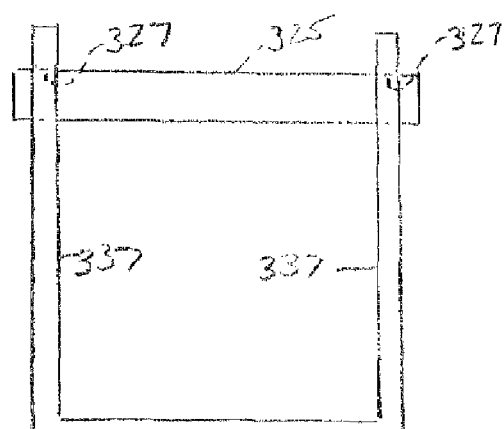

The roller support 23 can include horizontal leg members 39 at, e.g., a top and a bottom of the roller support. The horizontal leg members 39 can be identical or different. A useful, simple structure for the roller support 23 is as a substantially rectangular member. The roller 25 will be supported on a portion of the roller support 23 at a top of the roller support, such as on a horizontal leg member 39. The roller 25 may be supported on a leg member 139 that extends entirely through the roller (as seen in FIG. 8), in which case it may be useful to provide a roller that is attachable around the leg member or to have a removable leg member (as seen in FIG. 9) such as a spring loaded telescoping member 239 that is removably attachable in recesses 241 in vertical leg members 237. The roller 25 may be supported on leg members 339 that extend only partially along an axis of the roller as seen in FIG. 10. The roller 325 may be attached directly to vertical leg members 337 and rotate in recesses 327 in the vertical leg members as seen in FIG. 11. Of course, bearing members (not shown) may be provided in all of the embodiments to facilitate rotation of the rollers. Ordinarily, as seen in FIGS. 1A-1C, a top one 39 of at least two horizontal legs 39 of the roller support 23 includes the roller 25 disposed at the top of the roller support. As seen in FIGS. 10 and 11, the roller may define at least part of the top one of the horizontal legs, i.e., the roller forms part or all of the structure extending between the two vertical legs.

While FIGS. 1A-2 and 4-12 show circularly cylindrical rollers, it will be appreciated that rollers in the form of balls, such as are shown in FIG. 3, can be used in addition to or instead of cylindrical rollers. The invention is not, of course, limited to rollers in the form of circularly cylindrical or spherical rollers, although such rollers are understood to represent a substantial portion of the universe of rollers. The term "roller" as used herein is intended to be broadly defined, except where otherwise noted. A "roller" in the broad sense used herein can include, for example, movable belts and stationary surfaces that can function like rollers, such as low friction surfaces.

As seen, for example, in FIGS. 1A-1C, crossed struts 29 and 31 form scissor assemblies 27 that are connected to successive roller supports 23. To avoid bending the struts 29 and 31 in order to attach them to points on the roller supports 23 that all lie in the same plane, it is desirable that a first end 291 and a second end 292 of a first strut 29 (or, as seen on the right hand side of the structure 21 shown in FIG. 1C, a first end 311 and a second end 312 of a second strut 31) are pivotably connected to a first roller support 23 directly to a bottom part 23b of a first one of the two vertical leg members 37 of the first roller support and to a second roller support 23 directly to a top part 23t of a first one of the two vertical leg members 37, respectively. It is also desirable that a first end 311 and a second end 312 of a second strut 31 (or, as seen on the right-hand side of FIG. 1C, a first end 291 and a second end 292 of a first strut 29) are pivotably connected to the first roller support 23 through a spacer S to a top part 23t of the vertical leg member of the first roller support 23 and to a second roller support 23 through a spacer S to a bottom part 23b of the vertical leg member, respectively. The spacers S may be blocks having substantially the thickness of a strut 29 or 31 or may be a subsequent or preceding strut in a series of struts extending along the structure 21. The spacers S can substantially eliminate the need for bending struts, to connect ends of the crossed struts to points on the roller supports that lie in a common plane.

Figure 12:
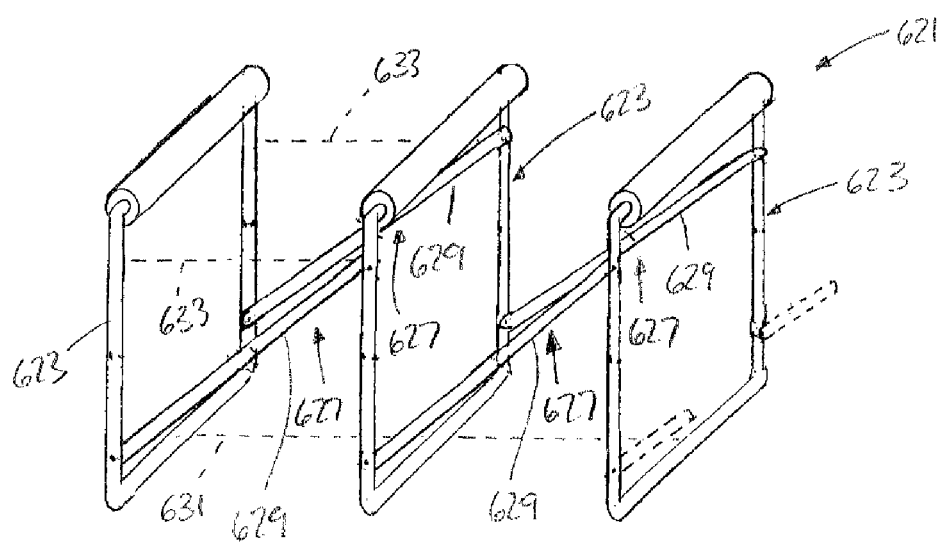
FIG. 12 is a perspective view of an expandable and collapsible structure according to an embodiment of the present invention.

While embodiments such as those seen in FIGS. 1A-7C include folding assemblies 27 in the form of scissor assemblies, as seen in FIG. 12 other forms of folding assemblies can be provided. For example, FIG. 12 shows an expandable and collapsible structure 621 wherein the at least one folding assembly 627 includes at least one strut 629 pivotably connected between the two of the plurality of roller supports 623. In this, as in at least some of the other embodiments, it may be desirable to provide one or more tension member 631 such as a flexible cable (although rigid structures such as struts may also be used) disposed between the two of the plurality of roller supports 623 to limit the extent to which the structure 621 can expand. A tension member 341 is also useful in, for example, the embodiment of FIGS. 5A-5C to limit the extent to which the telescopic struts 329 and 331 can extend. In the embodiment of FIG. 12 (and any other embodiments where it is determined to be desirable) it may be desirable to provide one or more compression members 633 disposed between the two of the plurality of roller supports 623 to facilitate supporting the structure 621 in an expanded condition. Compression members 633 will ordinarily be substantially inflexible.

Also, while it will ordinarily be desirable to orient the rollers 25 on a structure 21 such as is shown in FIG. 1 so that the rollers are on a top part of the structure, rollers can instead or in addition be provided on a bottom part of the structure. For example, the structure may include wheels 71 as shown in phantom in FIG. 1C or a roller 371 as shown in phantom in FIG. 5C. Such wheels or rollers may facilitate movement of the structure. In addition, while it may ordinarily be desirable to form the roller supports from rods, bars, or struts, the roller supports can be formed of other structures, such as panels or panels together with rods, bars, or struts, as seen in FIG. 10.

While this invention has been illustrated and described in accordance with a preferred embodiment, it is recognized that variations and changes may be made therein without departing from the invention as set forth in the claims.

What is claimed is:

1. An expandable and collapsible structure, comprising:
   a plurality of roller supports, each roller support including at least two ends separated by a non-zero distance, at least one horizontal roller disposed at one of the at least two ends of the roller support, and two vertical leg members; and
   a folding assembly consisting of two pairs of strut members disposed between each two successive ones of the plurality of roller supports, opposite ends of each strut member being pivotably and non-slidably attached to respective legs of successive ones of the two successive ones of the plurality of roller supports.

2. The expandable and collapsible structure as set forth in claim 1, wherein the two strut members are pivotably connected to each other by a pin.

3. The expandable and collapsible structure as set forth in claim 1, wherein the two strut members are telescopic.

4. The expandable and collapsible structure as set forth in claim 1, wherein the vertical leg members are telescopic.

5. The expandable and collapsible structure as set forth in claim 1, wherein the plurality of roller supports is rectangular.

6. The expandable and collapsible structure as set forth in claim 5, wherein at least one roller support comprises at least two vertical legs and at least two horizontal legs disposed between the at least two vertical legs.

7. The expandable and collapsible structure as set forth in claim 6, wherein a top one of the at least two horizontal legs comprises the roller disposed at the top of the roller support.

8. The expandable and collapsible structure as set forth in claim 7, wherein the roller defines at least part of the top one of the at least two horizontal legs.

9. The expandable and collapsible structure as set forth in claim 1, further comprising at least one tension member disposed between the two of the plurality of roller supports.

10. The expandable and collapsible structure as set forth in claim 1, further comprising at least one compression member disposed between the two of the plurality of roller supports.

11. The expandable and collapsible structure as set forth in claim 1, wherein at least one roller on at least one roller support is a cylinder.

12. The expandable and collapsible structure as set forth in claim 1, wherein at least one roller on at least one roller support is a ball.

13. An expandable and collapsible structure, comprising:
   a plurality of roller supports, each roller support including at least two ends separated by a non-zero distance and at least one roller disposed at one of the at least two ends of the roller support; and
   at least one folding assembly disposed between two of the plurality of roller supports,
   wherein the plurality of roller supports include two vertical leg members, the at least one scissor assembly comprises at least two strut members, and a first end and a second end of a first strut of the at least two strut members are pivotably connected to a first roller support directly to a bottom part of a first one of the two vertical leg members of the first roller support and to a second roller support directly to a top part of a first one of the two vertical leg members, respectively, and a first end and a second end of a second strut of the at least two strut members are pivotably connected to the first roller support through a spacer to a top part of the first one of the two vertical leg members of the first roller support and to the second roller support through a spacer to a bottom part of the first one of the two vertical leg members, respectively.

14. The expandable and collapsible structure as set forth in claim 13, wherein the at least two strut members are pivotably connected to each other by a pin.

15. The expandable and collapsible structure as set forth in claim 14, wherein the at least two strut members are telescopic.

* * * * *